United States Patent
Kerr et al.

(10) Patent No.: US 12,014,052 B2
(45) Date of Patent: Jun. 18, 2024

(54) COOPERATIVE STORAGE ARCHITECTURE

(71) Applicant: Google LLC, Mountain View, CA (US)

(72) Inventors: Benjamin James Kerr, Danville, CA (US); Nital Pankajkumar Patwa, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/207,909

(22) Filed: Mar. 22, 2021

(65) Prior Publication Data

US 2022/0300165 A1    Sep. 22, 2022

(51) Int. Cl.
*G06F 12/00*    (2006.01)
*G06F 3/06*    (2006.01)

(52) U.S. Cl.
CPC .......... *G06F 3/0613* (2013.01); *G06F 3/0607* (2013.01); *G06F 3/0619* (2013.01); *G06F 3/0629* (2013.01); *G06F 3/0659* (2013.01); *G06F 3/0683* (2013.01)

(58) Field of Classification Search
CPC ............. G06F 11/1441; G06F 12/0246; G06F 12/1081; G06F 13/1642; G06F 2212/7201; G06F 2212/7203; G06F 2212/7205
USPC ......................................................... 711/154
See application file for complete search history.

(56) References Cited

U.S. PATENT DOCUMENTS

| | | | |
|---|---|---|---|
| 8,463,977 B2 | 6/2013 | Cooper et al. | |
| 9,507,722 B2 | 11/2016 | Desai et al. | |
| 9,692,402 B2 | 6/2017 | Wagh et al. | |
| 9,767,058 B2 | 9/2017 | Huang | |
| 9,940,287 B2 | 4/2018 | Das Sharma | |
| 10,860,228 B1 | 12/2020 | Mulani et al. | |
| 11,175,984 B1* | 11/2021 | Lercari | G06F 11/0784 |
| 11,216,214 B2* | 1/2022 | Oh | G06F 9/52 |
| 2013/0135816 A1 | 5/2013 | Huang | |
| 2015/0242128 A1* | 8/2015 | Margalit | G06F 3/0658 |
| | | | 711/103 |
| 2015/0331624 A1 | 11/2015 | Law | |
| 2017/0011002 A1 | 1/2017 | Shin | |
| 2018/0246664 A1* | 8/2018 | Wu | G06F 3/0679 |
| 2018/0253252 A1* | 9/2018 | Yamamoto | G06F 3/0619 |

(Continued)

FOREIGN PATENT DOCUMENTS

EP    2765501 A1    8/2014

OTHER PUBLICATIONS

Extended European Search Report for European Patent Application No. 21185955.8 dated Jan. 4, 2022. 8 pages.

*Primary Examiner* — Mohamed M Gebril
(74) *Attorney, Agent, or Firm* — Lerner David LLP

(57) ABSTRACT

The present disclosure provides an interconnect architecture that enables communications and/or data transmissions among data storage drives in a computing system. The flash translation layer (FTL) in each data storage drive may be operated in a cooperative manner that allows communications and/or data transmissions across memory arrays from each of the data storage drives implemented in the computing system. The direct communications and/or data transmissions among the data storage drives in the computing system may be enabled without deferring back to a host computing device in the computing system. Thus, the computational load to the host computing device is reduced and the flexibility of scaling up the storage appliance in the computing system is increased.

14 Claims, 7 Drawing Sheets

(56) References Cited

U.S. PATENT DOCUMENTS

| | | |
|---|---|---|
| 2019/0102293 A1* | 4/2019 | Li .......................... G06F 3/065 |
| 2019/0108158 A1* | 4/2019 | Kachare ................ G06F 3/0632 |
| 2019/0146911 A1* | 5/2019 | Ha ...................... G06F 11/1068 |
| | | 711/103 |
| 2020/0012604 A1 | 1/2020 | Agarwal |
| 2020/0042228 A1 | 2/2020 | Roberts |
| 2020/0050402 A1 | 2/2020 | Furey et al. |
| 2020/0125503 A1 | 4/2020 | Graniello et al. |
| 2020/0176071 A1 | 6/2020 | Ng |
| 2020/0192842 A1 | 6/2020 | Ng et al. |
| 2020/0201575 A1* | 6/2020 | Mizrahi ................ G06F 3/0653 |
| 2020/0218646 A1* | 7/2020 | Li .......................... G06F 13/28 |
| 2020/0226081 A1 | 7/2020 | Kalyanasundharam et al. |
| 2020/0293483 A1* | 9/2020 | Haimzon ............ G06F 13/4221 |
| 2020/0328879 A1 | 10/2020 | Makaram et al. |
| 2021/0223994 A1* | 7/2021 | Kanno ................ G06F 3/0644 |
| 2021/0334217 A1* | 10/2021 | Sharma ............... G06F 12/0246 |
| 2022/0138106 A1* | 5/2022 | Vankamamidi ......... G06F 3/061 |
| | | 711/3 |

* cited by examiner

COOPERATIVE STORAGE ARCHITECTURE

BACKGROUND

NAND flash memory-based solid state drives (SSDs) have been widely used in various applications for their higher bandwidth and lower latency, compared to hard disk drives (HDD). Generally, SSDs provide faster access time and lower power consumption than comparable HDDs. An interconnection protocol is often utilized between a host computing device and the solid state drives (SSDs) to facilitate signal and data transmission. The host computing device acts as a server that provides information resources, services, commands, and/or applications to users or other nodes on a network. The host computing device manages the SSDs to access data, such as read or write data, from the SSDs for operations and storage and provides services, such as auto-tiering and global wear-level management.

In recent years, multiple solid state drives (SSDs) are often utilized to provide multiple storage arrays for constructing a large data storage appliance in a computing system. As a result, communications and/or connections between a central host, such as the host computing system, and the solid state drives (SSDs) become complicated and sometimes congested. As the data communication and/or signal transmission from the solid state drives (SSDs) are required to be deferred back to the host computing system for management under the current interconnection protocol, the computational load and memory bandwidth load added to the host computer device significantly increases as the size of the storage appliance grows. When the host computing device reaches its maximum computational load and memory bandwidth load, the number of the solid state drives allowed under the host computing device also reaches to its limit, thus, constraining further growth of the capacity of the storage appliance.

BRIEF SUMMARY

The present disclosure provides an interconnect architecture that enables communications and/or data transmissions among data storage drives in a computing system with minimum involvement from a host computing device in a computing system. The flash translation layer (FTL) in each data storage drive may be operated in a cooperative manner that allows communications and/or data transmissions across memory arrays from each of the data storage drives implemented in the computing system. In one example, one aspect of the disclosure described herein includes a method of processing a command in a computing system. The method includes receiving, by one or more processors, an operational command in a first data storage drive disposed in a computing system, directly communicating, by the first data storage drive, with a second data storage drive disposed in the computing system in response to the operational command, and determining, by the one or more processors based on the communicating, a data storage drive in the computing system to process the operational command.

In one example, the determining of the data storage drive is further based on a type of the operational command. When the operational command is a read command, the determining of the data storage drive is based on a flash translational layer indicating where data resides in the first and/or second data storage drives. When the operational command is a write command, the determining of the data storage drive is based on an allocation table including at least one of global drive properties or global drive wear statistics. The global drive properties comprise at least one of capacity or wear capability. The direct communication with the second data storage drive further includes directly communicating without communicating with a host computing device in the computing system. The first and second are solid state drives. The operational command includes a data write command, a data read command, a data program command or a data erase command.

In one example, the receiving of the operational command in the first data storage drive further includes processing, by the one or more processors, the operational command by a first buffer manager configured in the first data storage drive and directly communicating, by the one or more processors, from the first buffer manager to a second buffer manager configured in the second data storage drive.

In one example, the data blocks are defined in a plurality of non-volatile memory or a plurality of volatile memory disposed in the first or second data storage drives. The plurality of non-volatile memory is a plurality of NAND flash memory. In another example, the plurality of volatile memory is plurality of DRAM. The direct communication between the first and the second solid state drives is transmitted by an interconnection link protocol defined between first and the second solid state drives. The interconnection link protocol enables direct communications between the first and the second data storage drives without communicating with a host computing device in the computing system.

Another aspect of the disclosure includes an apparatus. The apparatus includes a computing system including a host computing device. A plurality of data storage drives is in communication with the host computing device. An interconnection link protocol is in connection with the plurality of data storage drives in the computing system. The interconnection link protocol allows direct communication among the plurality of the data storage drives without involvement from the host computing device.

In one example, the interconnection link protocol allows direct communications among flash translational layers configured in each the plurality of the data storage drives. The interconnection link protocol allows direct communications among buffer managers configured in each of the plurality of the data storage drives. The data storage drives are solid state drives.

Yet another aspect of the disclosure includes a system for processing a command. The system includes one or more processors configured to receive an operational command in a first data storage drive disposed in a computing system. The first data storage drive is directly communicated with a second data storage drive disposed in the computing system in response to the operational command A data storage drive in the computing system is determined to process the operational command.

DETAILED DESCRIPTION

The present disclosure provides an interconnect architecture that enables communications and/or data transmissions among data storage drives implemented in a computing system. In one example, the data storage drives utilized herein are solid state drives (SSDs). The flash translation layer (FTL) in each SSD may be configured to be operated in a cooperative manner that allows communications and/or data transmissions across the data storage drives, such as device-to-device communication or memory-to-memory communication, in the storage appliance from each of the SSD installed in the computing system. The FTL configured in each of the SSDs may process write/read commands across all the SSDs without the need to defer back to a host computing device implemented in the computing system. Thus, in the example wherein additional SSDs are added into the computing system, the processing capacity of the FTL also increases to accommodate management of the additional added SSD in the computing system, thereby providing lateral scalability for the storage appliance in the computing system. Such lateral scalability enables the construction of much larger storage appliances by increasing the number of data storage drives implemented in the computing system, without needing to increase the performance of the respective host computing device in the computing system.

The conventional interconnection architecture requires a host computing device, such as a host processor, to manage communications among the attached devices, such as the data storage drives, in the computing system. For example, the host computing device manages the storage appliance in the memory arrays of each data storage drive, often referred as a host-to-device (H2D) communication. Thus, separated commands or requests are required to issue from the host computing device to the storage appliance in each data storage drive individually for data communication. By enabling the communications among the data storage drives, such as device-to-device (D2D) communications, commands/requests from one data storage drives may be transmitted to another data storage drives through the configurations and settings from the FTL in the data storage drives in a cooperative manner, thus offloading some of the computational load and memory bandwidth load required from the host computing device. Thus, a simplified data transaction flow may be obtained with less traffic time and higher transmission efficiency in support for emerging computing applications.

Figure 1:
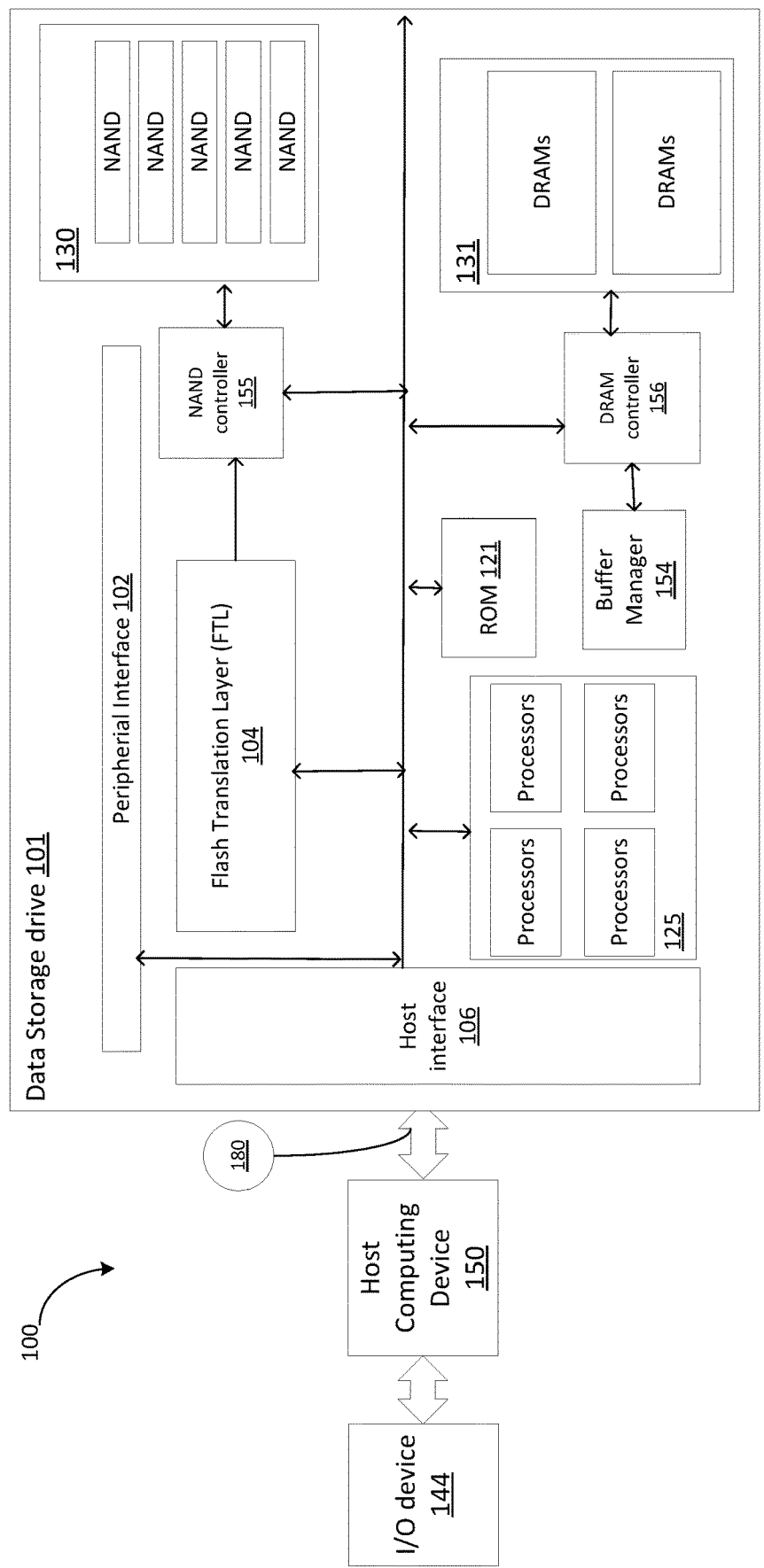
FIG. 1 is a block diagram illustrating a computing system in accordance with aspects of the disclosure.

FIG. 1 is a block diagram illustrating a computing system 100. The computing system 100 may be any type of computing device. For example, the computing system 100 may be a server system in which various devices may be in electrical communication thereto through network or through physical connection. The computing system 100 includes a host computing device 150 and a data storage drive 101. The host computing device 150 is in electrical commutations with the data storage drive 101 via single or multiple interconnects, connection bus, traces, pins, etc. In one example, the date storage device 101 depicted in FIG. 1 may be a solid state drive (SSD). It is noted that other types of devices, such as accelerator devices, may also be implemented in the computing system 100 to increase the operational performance of the computing system 100.

The host computing device 150 and the data storage drive 101 may be implemented using the techniques described herein. The host computing device 150, in this example, may be an electronic device that is operably coupled with the data storage drive 101. The host computing device 150 may issue various types of commands and/or requests, such as relaying or processing the requests from an I/O device 144 operated by a user, to the data storage drive 101. The host computing device 150 may be in a number of forms. As some examples, the host computing device 150 may be implemented as CPU or a CPU together with an accelerator utilized in a personal computer, a laptop computer, a server, a tablet computer or a notebook computer, or any suitable forms.

In one example, the one or more I/O devices 144 may be coupled to the host computing device 150 via various suitable networks, such as Ethernet-based communication protocol, WIFI connection protocol, or other suitable communication protocols. The host computing device 150 is configured to receive incoming requests/commands from the one or more I/O devices 144.

In one example, the host computing device 150 may be connected to the data storage drive 101 through an interconnect link protocol 180 to enable data, signal and messages to transmit therebetween. In some embodiments, the interconnect link protocol 180 may be operable to support multiple protocols and communication of data and signal via the multiple interconnect protocols, including a Compute Express Link (CXL) protocol, a cache coherent interconnect for accelerators (CCIX) protocol, Ethernet protocol, etc. For example, the interconnect link protocol 180 may support various interconnect protocols, including a non-coherent interconnect protocol, a coherent interconnect protocol, a memory interconnect protocol, etc.

In one example, the data storage drive 101 may be a solid state drive that includes a controller 102 having a plurality of components embedded therein. The controller 102 is operably coupled to one or more non-volatile memory, such as a plurality of NAND flash memory 130 and a random-access memory (RAM), such as a plurality of DRAM memory 131, which include one or more memory dies. The memory die, or chip, includes a memory structure, such as an array of memory cells, control circuitry, and read/write circuits. The memory structure is addressable by word lines. The read/write circuits include multiple memory blocks and allow a page of memory cells to be read or programmed in parallel. Commands and data are transferred between the controller 102 and the one or more memory die via communication lines in the plurality of DRAM memory 131 and the plurality of NAND flash memory 130.

The NAND flash memory 130 may be a two-dimensional NAND flash memory a three-dimensional NAND flash memory. The memory structures may comprise a monolithic 3D memory structure in which multiple memory levels are formed above a single substrate, such as a wafer, with no intervening substrates. The controller 102 may resemble the data or signal passing therethrough from a first format to a second format that is readable/writable for the NAND memory 130 or DRAM memory 131.

Examples of the volatile memory devices include dynamic random access memory (DRAM) or static random access memory (SRAM) devices and the like. Examples of the non-volatile memory devices include resistive random access memory (ReRAM), electrically erasable programmable read-only memory (EEPROM), flash memory, ferroelectric random access memory (FRAM), and magnetoresistive random access memory (MRAM), and other semiconductor elements capable of storing information. Each type of memory device may have different configurations. For example, flash memory devices may be configured in NAND or a NOR configurations. The memory devices can be formed from passive and/or active elements, in any combinations. In one example, passive semiconductor memory elements include ReRAM device elements, which in some embodiments include a resistivity switching storage element, such as an anti-fuse or phase change material, and optionally a steering element, such as a diode or transistor. Active semiconductor memory elements include EEPROM and flash memory device elements, which in some embodiments include elements containing a charge storage region, such as a floating gate, conductive nanoparticles, or a charge storage dielectric material.

The controller 102 in the data storage drive 100 includes a host interface 106 having a host interface circuit configured to communicate with the host computing device 150. For example, the host interface 106 may include a Non-Volatile Memory Express specification, e.g., a NVMe controller, or other suitable types of the interface circuit to facilitate communication between the host computing device 150 and the data storage drive 101. The host interface 106 may receive various commands, such as a write command, a read command, move command, erase command, or other various operational commands from the host computing device 150 to perform various tasks in the data storage drive 101. For example, a write command may be transmitted from the host computing device 150 to request the data storage drive 101 to write data in the memory 130, 131 based on the write command In one example, a write command may include a start logic block addressing (LBA), a transmission length and a registration ID. The registration ID in the write command may be an identifier for identifying an area where data may be written. In one example, the registration ID may be a namespace ID. A read command may request the data storage drive 101 to fetch the data stored therein. The read command may also include a start LBA, a transmission length and a registration ID. The registration ID in the read command may also be utilized to identify an area where the data is stored in the data storage drive 101 to be read. The registration ID may also be a namespace ID.

The interconnect link protocol 180 may be interfaced with the host interface 106 to facilitate data connection or transmission therethrough.

In one example, a peripheral interface 102 may also be implemented in the data storage drive 101. The peripheral interface 102 includes a peripheral interface circuit configured to enable communications among the data storage drive or other data storage drives or other devices, such as an accelerator device, implemented in the computing system 100. For example, the peripheral interface 102 may facilitate direct data communication or direct signal transmission among the external devices, such as the data storage drives 101 or other data storage drives, as further shown in FIG. 2, without deferring the signals back to the host computing device 150. Thus, the data storage drive 101 and other drives may be in direct electrical communication to each other through the peripheral interface 102 without utilizing the host computing device 150 as a central processing agent to further forward or transmit the command therethrough. In one example, the peripheral interface 102 may be any suitable type of the interface circuit or interface interconnection protocol to facilitate communication among the data storage drives 101 or other devices in the computing system 100. It is noted that in the examples wherein the peripheral interface 102 is not present or configured in the data storage drive 101, the communications among the one or more data storage drives and other external devices may utilize software programming or interconnection protocols configured in the interconnect link protocol 180 for facilitate the lateral communications, such as device-to-device or drive-to-drive (D2D) communications, without or with less involvement from the host computing device 150.

Similarly, the peripheral interface 102 may receive various commands, such as a write command, a read command, various control commands from the data storage drive 101 or other external devices. The write and read command may be similarly configured as the write and read commands from the host computing device 150.

A plurality of processors 125 may be implemented in the data storage drive 101. The plurality of processors 125 are configured to control the host interface 106, peripheral interface 102, if present, the DRAM controller 156 and the NAND controller 155. The processors 125 perform various processes and operations by loading a firmware, code, software or the like, from a ROM 121, the NAND memory 130 and/or the DRAMs 131. The memory, such as DRAM memory 131, ROM 121, and the NAND flash memory 130 include codes, such as a set of instructions, and the processors 125 are operable to execute the set of instructions to provide the functionality described herein.

In one example, the processors 125 may receive a command from the host computing device 150 and/or perform such command in the data storage drive 101. For example, the FTL 104 configured in the controller 102 may receive such command and operate the command for its intended purpose. In one example, the FTL 104 is configured to perform data management and block management of the NAND flash memory 130. The FTL 140 may be utilized for performing processes or operations, such as managing the write and read command to the NAND flash memory 130 with wear levelling, maintaining a logical to physical (L2P) mapping table in the NAND flash memory 130 and providing a logical block number interface to the host computing device 150, other devices implemented in the computing system 100. Thus, the operation or processing of the data storage drive 101 is controlled by the firmware, software, or algorithm executed by the processors 125.

Figure 2:
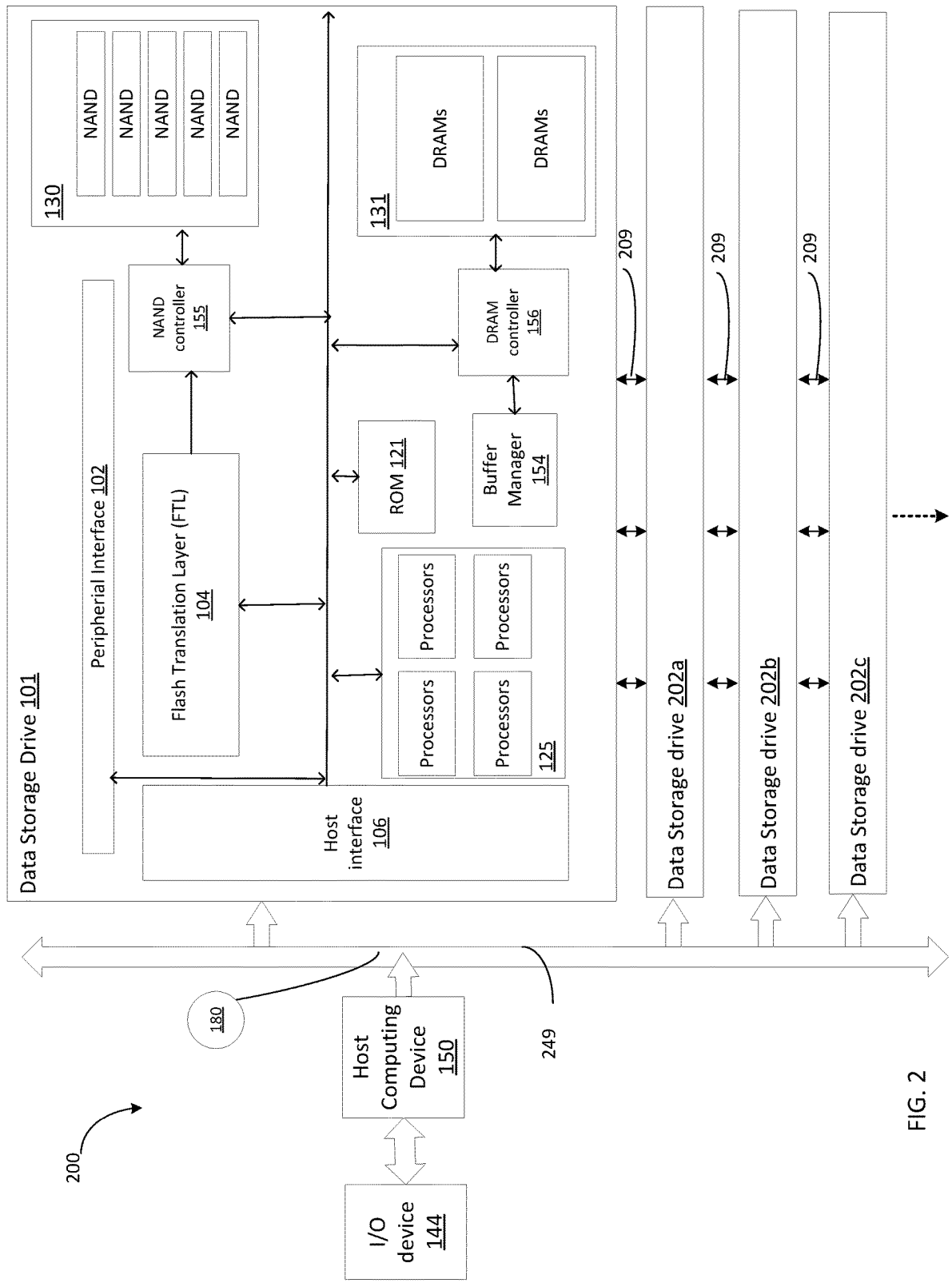
FIG. 2 is a block diagram illustrating communications among solid state drives (SSDs) in a computing system in accordance with aspects of the disclosure.

The processes programmed by the FTL 104 may be performed by the dedicated hardware, such as the NAND controller 151 or the processors 125 within the controller 102. In one example, the FTL 104 may be configured to interface with the host computing device 150 to process data communication or signal transmission through the host interface 106. In another example, in addition to data communication or signal transmission to or from the host computing device 150, the FTL 104 may be configured to interface with other data storage drives, as shown in FIG. 2, or other external device (not shown) in the computing system 100 for lateral data communication or signal transmission. The FTL 104 may be a module configured to be executed by the processors 125 for the internals of NAND flash memory management.

In one example, the FTL 104 may include an algorithm which translates write and read commands from the host computing device 150 into the write and read commands that may be operable by the NAND flash memory 130. The NAND controller 155 is configured to control the NAND flash memory 130 under the control of the processors 125. For example, the FTL 104 may format the NAND flash memory 130 to ensure the NAND flash memory 130 is operating properly, for example, mapping out bad flash memory cells, allocating spare memory cells to be substituted for future failed cells, etc. Some part of the spare cells can be used to hold firmware to operate the NAND controller 155 and implement other features. In operation, when the host computing device 150 needs to read data from or write data to the NAND flash memory 130, the host computing device 150 will communicate with the FTL 104. If the host computing device 150 provides a logical address to which data is to be read/written, the FTL 104 can convert the logical address received from the host computing device 150 to a physical address in the NAND flash memory 130. The FTL 104 can also perform various memory management functions, such as, but not limited to, wear leveling and garbage collection, which will be described in greater detail below.

In some examples, in addition to translate write and read commands between the host computing device 150 and the data storage drive 101, the algorithm configured in the FTL 104 may also enable communications and data transmissions among the data storage drives and/or other external devices implemented in the computing system 100.

A buffer manager 154 may also be configured in the processors 125. The buffer manager 154 may include an algorithm or a program configured to manage a write buffer for temporarily storing the write data in the DRAM 131, which may be later written to the NAND flash memory 130. The buffer manager 154 may buffer data read or write from the host computing device 150 configured to be written into the NAND flash memory 130 for data traffic management. The buffer manager 154 may write the data from the host computing device 150 to the NAND flash memory 130 and map the memory address and then write the data to the NAND flash memory 130 using logical block addressing (LBA). The buffer manager 154 may allocate a space in a cache, such as a volatile memory like the DRAM 131, so that a read command being processed has a temporary destination before being returned to the host computing device 150. The buffer manager 154 may also allow a write command to be temporarily stored in a cache in the buffer manager 154 until the data from the host computing device 150 can be sent to the NAND flash memory 130 or vice versa.

In one example, the buffer manager 154 is also configured to communicate with other data storage drive 101 or external devices implemented in the computing system 100 by execution of the processors 125. Thus, the content from the DRAM 131 may be transferred to other DRAM or memory in the computing system 100 to improve utilization of the storage capacity in the computing system 100 with minimum involvement from the host computing device 150.

The DRAM controller 156 is configured to control the DRAM memory 131 under the control of the processors 125. The programs and algorithms in the buffer manager 154 and the flash translation layer 104 may be executed and carried out by the processors 125 to control read and write command in the data storage drive 101 for data communication or signal transmission in the computing system 100.

FIG. 2 depicts an example of a computing system 200 having a plurality of data storage drive 101, 202a, 202b, 202c implemented therein. The data storage drive 202a, 202b, 202c, similarly configured or the same as the data storage drive 101, may also be solid state drives (SSDs). The plurality of data storage drives 101, 202a, 202b, 202c may be in direct electrical communication without or with less involvement from the host computing device 150. As discussed above, the flash translation layer (FTL) 104 in each of the plurality of the data storage drives 101, 202a, 202b, 202c may be configured not only to be in electrical communication with the host computing device 150, but also be in direct electrical communication among the data storage drives 101, 202a, 202b, 202c without intervention or involvement from the host computing device 150. For example, the FTL 104 may have an algorithm configured to allow transmission of the requests and commands directly among the data storage drives 101, 202a, 202b, 202c. The peripheral interface 102 in each of the data storage drives 101, 202a, 202b, 202c may transmit the signals or read or write commands from the FTL 104 or from the buffer manager 154 to the corresponding FTL or the corresponding buffer manager in each data storage drive 101, 202a, 202b, 202c. An interconnect link protocol connected and programmed among the data storage drives 101, 202a, 202b, 202c may enable data, signal or command transmission among the data storage drives 101, 202a, 202b, 202c. In some examples, the interconnect link protocol may be operable to support multiple protocols and communication of data and signal via the multiple interconnect protocols, including a Compute Express Link (CXL) protocol, a cache coherent interconnect for accelerators (CCIX) protocol, Ethernet protocol, etc. The interconnect link protocol may interface with the peripheral interface 102 for data transmission or connection. It is noted that the interconnection protocols are configured in a manner to allow the linear or lateral communications among the data storage drives 101, 202a, 202b, 202c without the involvement or relay from the host computing device 150, thus offloading some of the computational load from the host computing device 150. The interconnect link protocol may support various interconnect protocols, including a non-coherent interconnect protocol, a coherent interconnect protocol, a memory interconnect protocol, etc. Furthermore, each of the data storage drives 101, 202a, 202b, 202c may also be in physical connection via single or multiple interconnects 180, 209, such as connection bus, interconnection traces, pins, etc, to facilitate data transmission and/or signal communication therebetween. In some examples, the physical connection 209 may be a switched fabric.

In the example wherein the peripheral interface 102 is not present in the data storage drives 101, 202a, 202b, 202c, the data communications or signal transmissions among the data storage drives 101, 202a, 202b, 202c may utilize the interconnect link 180 configured in the computing system 200, which is interfaced with the host interface 106. Thus, the vertical communication, such as host-to-device (H2D) communication, along with the horizontal communication, such as the device-to-device (D2D) communication or called lateral or linear communication, may be integrated and enabled by the interconnect link protocol 180. For example, the data communications and/or signal transmission may utilize the protocols configured in the interconnect link protocol 180 to facilitate lateral or horizontal communications among the data storage drives 101, 202a, 202b, 202c. As discussed above, the interconnect link protocol 180 may be operable to support multiple protocols and communication of data and signal via the multiple interconnect protocols, including a Compute Express Link (CXL) protocol, a cache coherent interconnect for accelerators (CCIX) protocol, Ethernet protocol, etc. These interconnect protocols may be programmed or configured to allow the horizontal, lateral or linear communications among the data storage drives 101, 202a, 202b, 202c, such as D2D communication.

The FTL 104 or the buffer manager 154 programmed in each data storage drive 101, 202a, 202b, 202c may perform processes that coordinate with other FTL 104 or the buffer manager 154 in other data storage drives 101, 202a, 202b, 202c in the computing system 200. Thus, the usage, consumption, and capacity of the NAND flash memory 130 and the DRAMs 131 may be accessible and readable/writable by the processors 125 from any of the data storage drives 101, 202a, 202b, 202c implemented and available in the computing system 200. Thus, when a data write command is initiated, the FTL 104 or the buffer manager 154 from the data storage drives 101, 202a, 202b, 202c may coordinate cooperatively to efficiently locate a storage space for the data write request across the available NAND flash memory 130 and/or the DRAMs 131 among the data storage drives 101, 202a, 202b, 202c implemented in the computing system 200. The write command processing of the FTL 104 or the buffer manager 154 may be sharded or divided across the available processors 125 in the data storage drives 101, 202a, 202b, 202c so as to enable the parallel processing of the processors 125 across the data storage drives 101, 202a, 202b, 202c. Accordingly, the workload from the FTL 104 or the buffer manager 154 may be partitioned and transmitted to the available processors 125 across the D2D network so that the processors 125 from each of the data storage drives 101, 202a, 202b, 202c may share and process part of the workload. Thus, the workload sharded or divided to the different processors across the data storage drives 101, 202a, 202b, 202c may simultaneously process the command assigned to the FTL 104 or the buffer manager 154 without involvement from the host computing device 150. Thus, by doing so, the processes performed by each FTL 104 or the buffer manager 154 in each data storage drive 101, 202a, 202b, 202c may not need to defer back to the host computing device 150 for further dispatching, thus reducing the computing load and memory bandwidth load from the host computing device 150. Furthermore, the capacity of the storage appliance may be increased by simply increasing additional data storage drives 101, 202a, 202b, 202c implemented in the computing system 200 and increase the scalability of the storage application across the data storage drives 101, 202a, 202b, 202c without the need for a replacement of the host computing device 150 with higher performance requirement.

Figure 3:
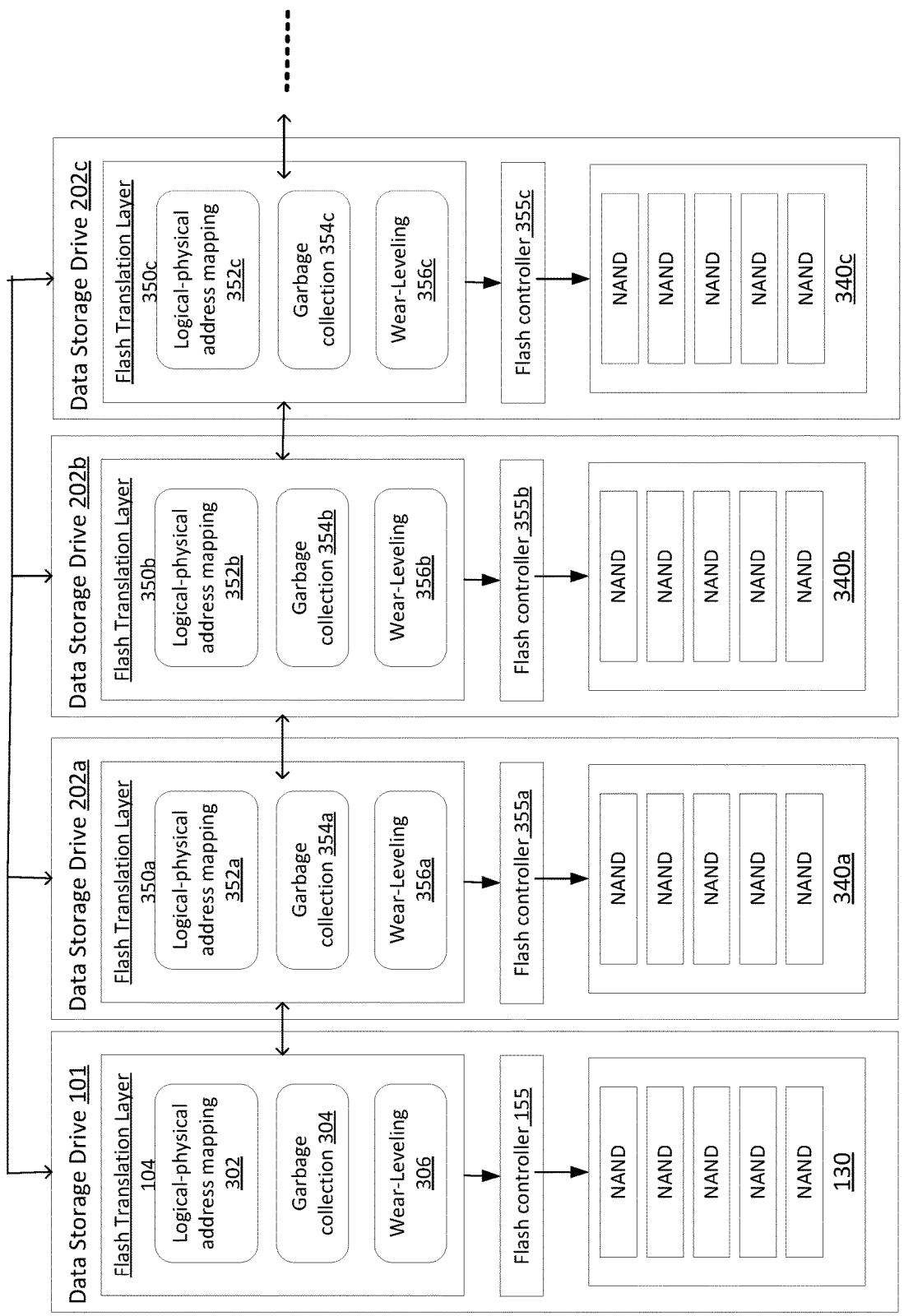
FIG. 3 is a block diagram illustrating communications among flash translation layers (FTL) in solid state drives (SSDs) in accordance with aspects of the disclosure.

FIG. 3 depicts a block diagram illustrating communications among FTLs 104, 350a-c in the SSDs 101, 202a-c in accordance with aspects of the disclosure. It is noted that other components, such as processors, DRAM, buffer manager or the like, are eliminated in FIG. 3 for ease of illustration and description. As described above, the FTLs 104, 350a-c in each data storage drives 101, 202a-c are configured to be in electrical communications with each other when performing processes executed by the processors. It is noted that the buffer manager in each data storage drives 101, 202a-c may also be similarly configured. The FTLs 104, 350a-c may include a logical to physical mapping block 302, 352a-c, a garbage collection block 304, 354a-354c and a wear-leveling block 306, 356a-c and the like. The logical to physical mapping block 302, 352a-c provides a mapping algorithm that may manage logical to physical mapping of data within the physical memory, such as the NAND flash memory 130, 340a-c. The FTL 104, 350a-c may be responsible for translating logical block addresses provided by a user, such as a write signal transmitted from the I/O device 144 through the hosting computing device 150 to any one of the SSDs 101, 202a-c, to physical block addresses in the NAND flash memory 130, 340a-c.

The garbage collection (GC) block 304, 354a-c also provides a GC algorithm that is configured to move data around in the NAND flash memory 130, 340a-c in order to ensure that program/erase (P/E) cycles of each physical memory block may be uniform. The GC block 304, 354a-c may have access to an allocation table configured in each data storage drive. The allocation table may include at least a global drive wear level and/or global drive properties. The access of the GC block 304, 354a-c to the global drive wear level and/or global drive properties may ensure that P/E cycles are uniform across all memory blocks in each of the data storage drives and across all data storage drives. The GC algorithm in the FTL 104, 350a-c may also be responsible for reclaiming physical memory blocks which contain invalidated data by copying their valid data to new blocks and erasing them in the GC block 304, 354a-c. The GC algorithm in the FTL 104, 350a-c may also be moving only the valid pages of data to a new block in the data storage drive or another data storage drive after a block is full, so the full block can be erased and reused.

Furthermore, over time, NAND flash memory 130, 340a-c may wear out. Thus, the wear-leveling block 306, 356a-c may provide a wear-leveling (WL) algorithm, which ensures that physical memory wears in a uniform manner via writing or copying data to appropriate places in the physical memory. The WL algorithm may uniformly distribute writes to avoid wearing out specific blocks of memory that would otherwise be repeatedly written to.

By configuring the algorithms in the FTL 104, 350a-c to allow the direct communications among the SSDs 101, 202a-c, the functions of the GC, logical to physical mapping, and the wear-leveling performed in the NAND flash memory 130, 340a-c may be collectively and cooperatively operated. For example, the cooperative operation of the drives 101, 202a-c may be able to level the wear across the entire group of drives 101, 202a-c in a relatively uniform manner to avoid the likelihood of one particular drive becoming a wearing hotspot. This benefit may also be maintained and achieved while the drives continue to provide the same total capacity and the same static allocation of logical block address space that the host computing device 150 is configured to operate.

Thus, the NAND flash memory 130, 340a-c located at the different SSDs 101, 202a-c may be managed by any one of the FTL 104, 350a-c in the SSDs 101, 202a-c. For example, the processes and/or functions performed by the GC block 304, 354a-c, logical to physical mapping block 302, 352a-c, and the wear-leveling block 306, 356a-c, may be coordinated at the storage appliance level among the SSDs 101, 202a-c with less or no involvement from the host computing device. Furthermore, the degree of wearing among the NAND flash memory 130, 340a-c in the SSDs 101, 202a-c may be detected in a collective manner by the FTL 104, 350a-c so the data across the NAND flash memory 130, 340a-c may be re-mapped to avoid certain areas or certain specific NAND flash memory 130, 340a-c being worn-out faster than the others.

In one example, the physical memory may be implemented using a number of different types of memory devices. In one example depicted herein that the physical memory may be implemented using flash memory devices, such as NAND flash memory devices 130, or other types of non-volatile memory devices. In certain implementations, volatile memory devices, such as random-access memory devices, may be used for the physical memory. It is noted that other types of physical memory are possible and other types of memory devices may be used to implement what is described herein.

Furthermore, the processor 125 may generate namespaces that define logical blocks of the data stored in the NAND flash memory 130, 340*a-c*. The generation of the namespaces also consumes resources of the NAND flash memory 130, 340*a-c*. Thus, a single SSD may only have a certain limited capacity to allow generation of certain numbers of the namespaces. In one example, 8 namespaces may be supported in one single SSD. With the device-to-device communication that allows direct communications among the FTLs 104, 350*a-c*, the namespaces assigned or generated in each SSD may be combined, shared or consolidated using the algorithms as programed, thus rendering 8×N namespaces, e.g., N being the number of SSDs implemented in the computing system, available in the computing system for additional resources for utilization among the SSDs.

Figure 4:
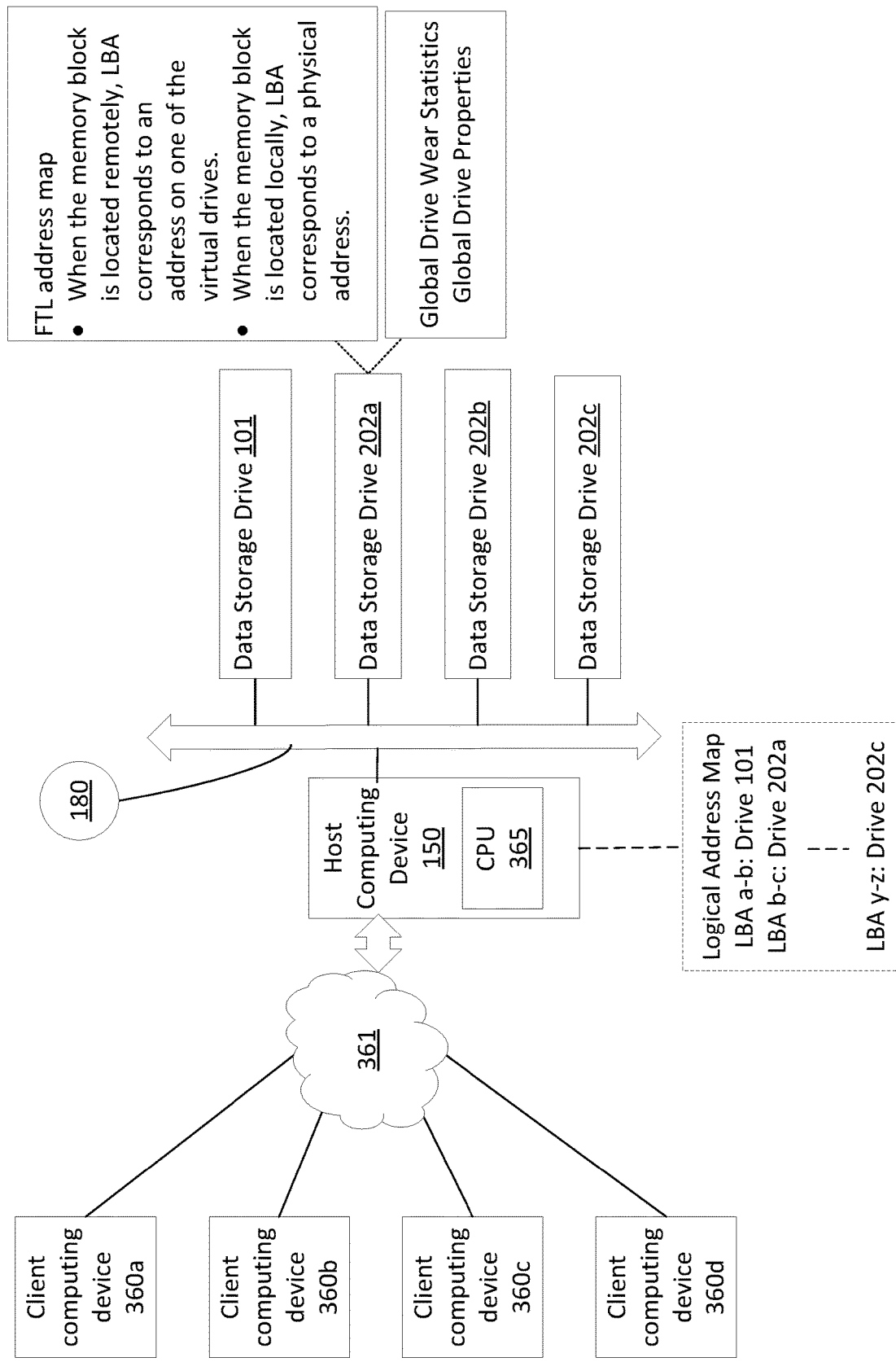
FIG. 4 is a block diagram illustrating communications among client computing devices, a host computing device and solid state drives (SSDs) in accordance with aspects of the disclosure.

FIG. 4 is a block diagram illustrating an example of communications among client computing devices, a host computing device and solid state drives (SSDs) in accordance with aspects of the disclosure. One or more client computing devices 360*a*, 360*b*, 360*c*, 360*d*, similar to any suitable types of I/O device 144 described above, may be used to provide commands to the host computing device 150. The commands may be transmitted to the host computing device 150 by various suitable networks 361. A processor, such as a CPU 365, may be implemented in the host computing device 150 configured to serve the read and write commands issued from the client computing devices 360*a*-360*d*. The CPU 365 may allocate the logical address space to each drive 101, 202*a*, 202*b*, 202*c* through the interconnect link protocol 180 or other suitable communication protocols. Accordingly, each read or write commands transmitted from the client computing devices 360*a*-360*d* may reach out to the designated drive to serve the logical address. The CPU 365 is in communication with the drives 101, 202*a*, 202*b*, 202*c* for read and write commands over the interconnect link protocol 180.

By utilizing the drive-to-drive communications, the interconnect link protocol 180 and/or the lateral interconnect link protocol may permit the communication among the drives 101, 202*a*, 202*b*, 202*c*. The drives 101, 202*a*, 202*b*, 202*c* are in communication with each other so that the commands, the address maps from the CPU 365, and the wear statistics of its own drive may be transmitted therebetween. The drives 101, 202*a*, 202*b*, 202*c* are capable of transferring data to each other over the interconnect link protocol 180 and/or the lateral interconnect link protocol to enable the drive-to-drive (D2D) communications. The drives 101, 202*a*, 202*b*, 202*c* are also capable of instructing other drives 101, 202*a*, 202*b*, 202*c* to transfer data to the CPU 365 at the address map provided.

In one example, each drive 101, 202*a*, 202*b*, 202*c* is configured to maintain each FTL that permits the allocated logical block to be mapped to a remote drive or other drives in the system. The FTL may also maintain the physical address of logical blocks that the drive 101, 202*a*, 202*b*, 202*c* holds. Each drive 101, 202*a*, 202*b*, 202*c* may include an allocation table, such as at least a global drive property table and/or a global drive wear statistics table that shows properties or the wear level of each drive in the storage system. As each drive 101, 202*a*, 202*b*, 202*c* may have different properties, such as different storage capacity and/or the wear capabilities, such global drive property table and/or wear statistics table may provide the related drive properties and information to each drive 101, 202*a*, 202*b*, 202*c* allocated in the system. For example, a qual-level cell (QLC) drive may have higher capacity but lower wear capabilities than a triple-level cell (TLC) drive.

Thus, when a write command is issued by the CPU 365 to one of the drives 101, 202*a*, 202*b*, 202*c*, such as the drive 101, the selected drive 101 may examine the global wear statistics and global driver properties in the table and determines whether the write command should be transferred to a more suitable remote drive or other suitable drives in the system. In the situation wherein the selected drive determines to accept the write command, a prior written block in the drive may be transferred or passed to another remote or local drive that is more suitable to hold such prior written block.

In contrast, when a read command is issued by the CPU 365 to a drive, the drive may examine its FTL to locate the drive where the data resides in. Once the data is located, the read command may be transmitted to that drive where the data resides in. In some examples, the remote drive will directly transfer the data to the CPU 365.

Furthermore, the drive-to-drive communication may also utilize a cooperative storage system with heterogeneous drives and auto-tiering so as to provide a better capacity and/or performance operating point as well as a reduced operating cost. For example, cooperative drives may perform an auto-tiering based on types of the data characteristics received and drives available in the cooperative storage system. As such, each type of data saved to the drives may have matching properties. For example, the auto-tiering may include a group of fast drives may be a fast tier, also referred as a high tier. In contrast, a group of slow drives may be a slow tier, also referred as a low tier. Thus, different tiers from the auto-tiering functionality may allow different properties of data stored at different drives to achieve desired operational performance at a desired price range. Data stored in the fast tier is often referred as hot data while data stored in the slow tier is often referred as cold data. Thus, by utilizing the cooperative storage operation, the cold data may be configured to store in Quad-level cell (QLC) drives, such as a lower tier drive, while hot data may be configured to store in a relatively high-endurance multiple level cell (MLC) drive, such as a high tier drive. A data that is frequently read may be configured to store in a low-latency drive. Thus, by utilizing the cooperative storage system, a good data matching and allocation management may be obtained to achieve high operation performance as well as maintaining low operational cost.

Figure 5:
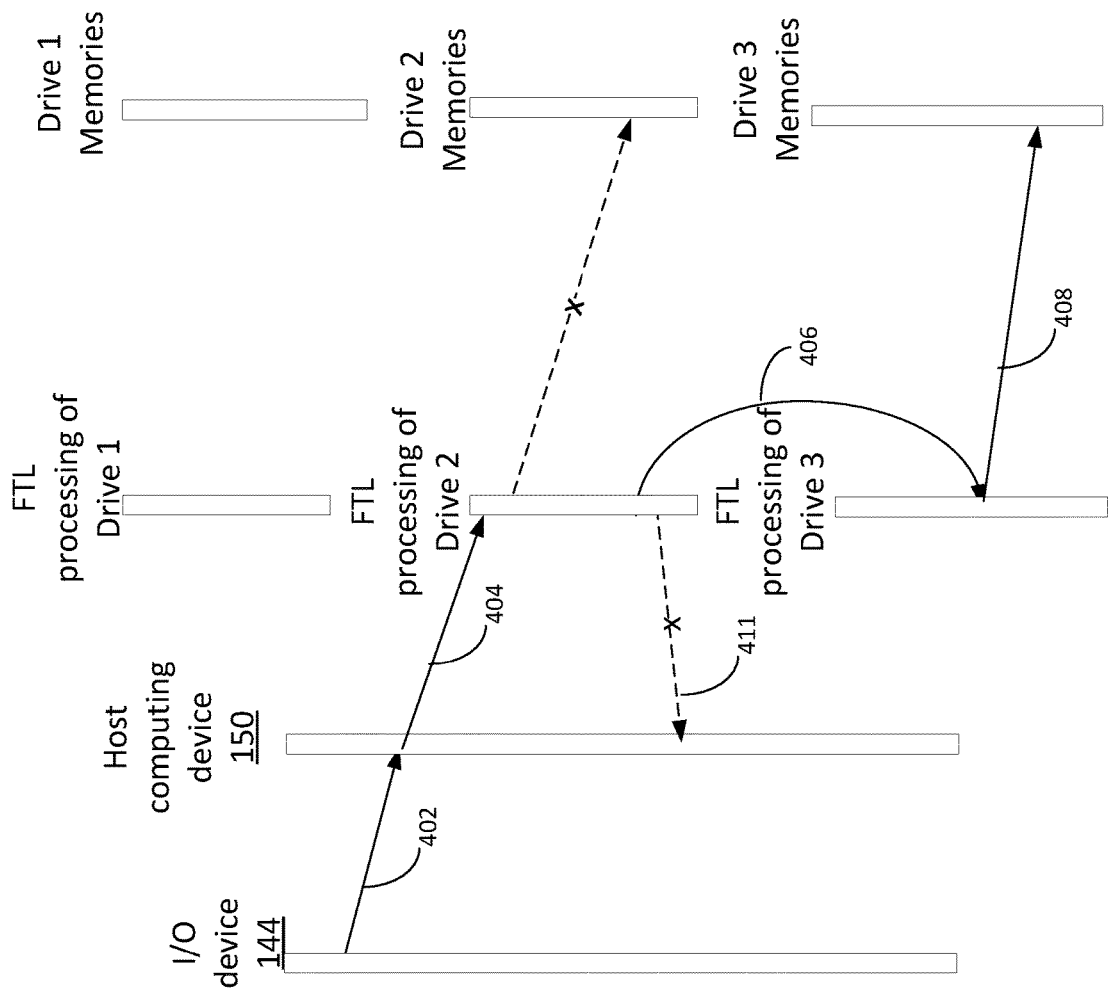
FIG. 5 is a data processing sequence diagram illustrating an example of data transmission among SSDs in accordance with aspects of the disclosure.

FIG. 5 depicts a data processing sequence diagram illustrating an example data transmission among the data storage drives utilizing the device-to-device communication in accordance with aspects of the disclosure. In the example depicted in FIG. 5, an incoming write command may be initiated by a user utilizing the I/O device 144. The write command may then be transmitted to the host computing device 150 for processing, as shown by the signal flow path 402. It is noted that the command that may be transmitted among the components in the computing system may include data write command, data read command, data write/program command, and data erase command, as well as other types of data command/requests, such as for example move commands and/or copy commands.

The processor in the computing device 150 may determine to transmit the write command to which one of the data storage drives available in the computing system for storage. In the example depicted in FIG. 5, the processor in the computing device 150 may further transmit the write command to the device 2, as shown in the signal flow path 404, intended to store the write command in device 2 memory. However, the device 2 memory may be for any reasons, such as memory cell malfunction or the like, that may not be ready to receive the write command Thus, instead of deferring the write command back to the host computing device 150 for further dispatching or instruction, as shown in the signal flow path 411, the write command may be transmitted to other data storage drive, such as the device 3, as shown in the signal flow path 406. The device-to-device communications provided by the FTLs in each device may collectively communicate in a cooperative manner to determine a suitable data storage drive for processing the write command Thus, the device-to-device communications enable the direct communications among drive 1, drive 2 and drive 3. Thus, the write command may be transmitted to suitable drivers, such as the drive 3, for storing the write command in the device 3 memory, as shown in the signal flow path 408.

Figure 6:
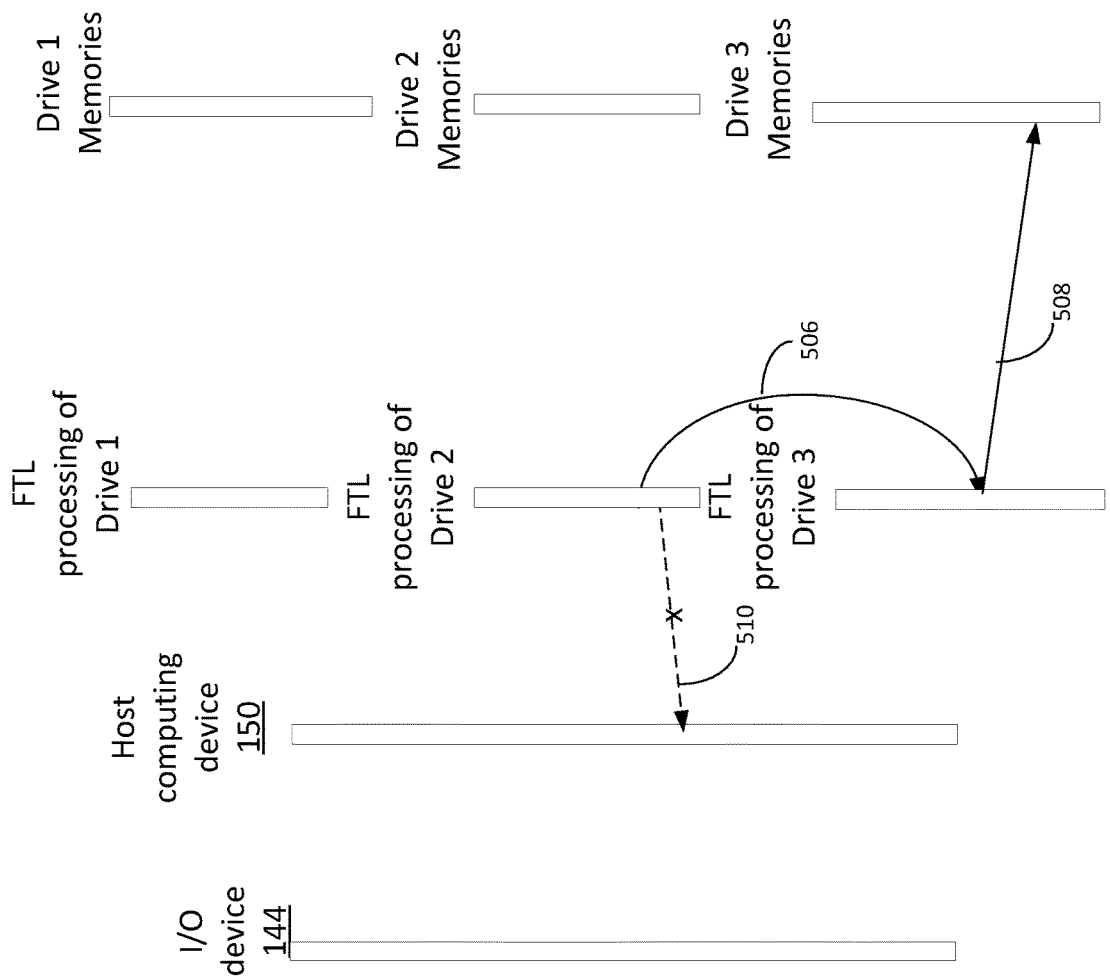
FIG. 6 is a data processing sequence diagram illustrating another example of data transmission among SSDs in accordance with aspects of the disclosure.

FIG. 6 is a data processing sequence diagram of another example process of processing a write command among the solid state drives in a computing system that utilizes the D2D communication in accordance with aspects of the disclosure. For example, when a write command, such as a rewrite data command from a defective block in a first drive to a good block in a second drive, is initiated from the FTL in the drive 2, instead of deferring the write command to the host computing device 150, the write command may be directly transmitted to the FTL in the drive 3, as shown in the signal flow path 506, by direct communication therebetween to determine a suitable drive for processing the write command. The FTL in the drive 3 may then process the write command in the drive 3, such as rewriting the data into a good block in the drive 3 memory, as shown in the signal flow path 508, without deferring the write command to the host computing device, as shown in the signal flow path 510 for a decision.

Figure 7:
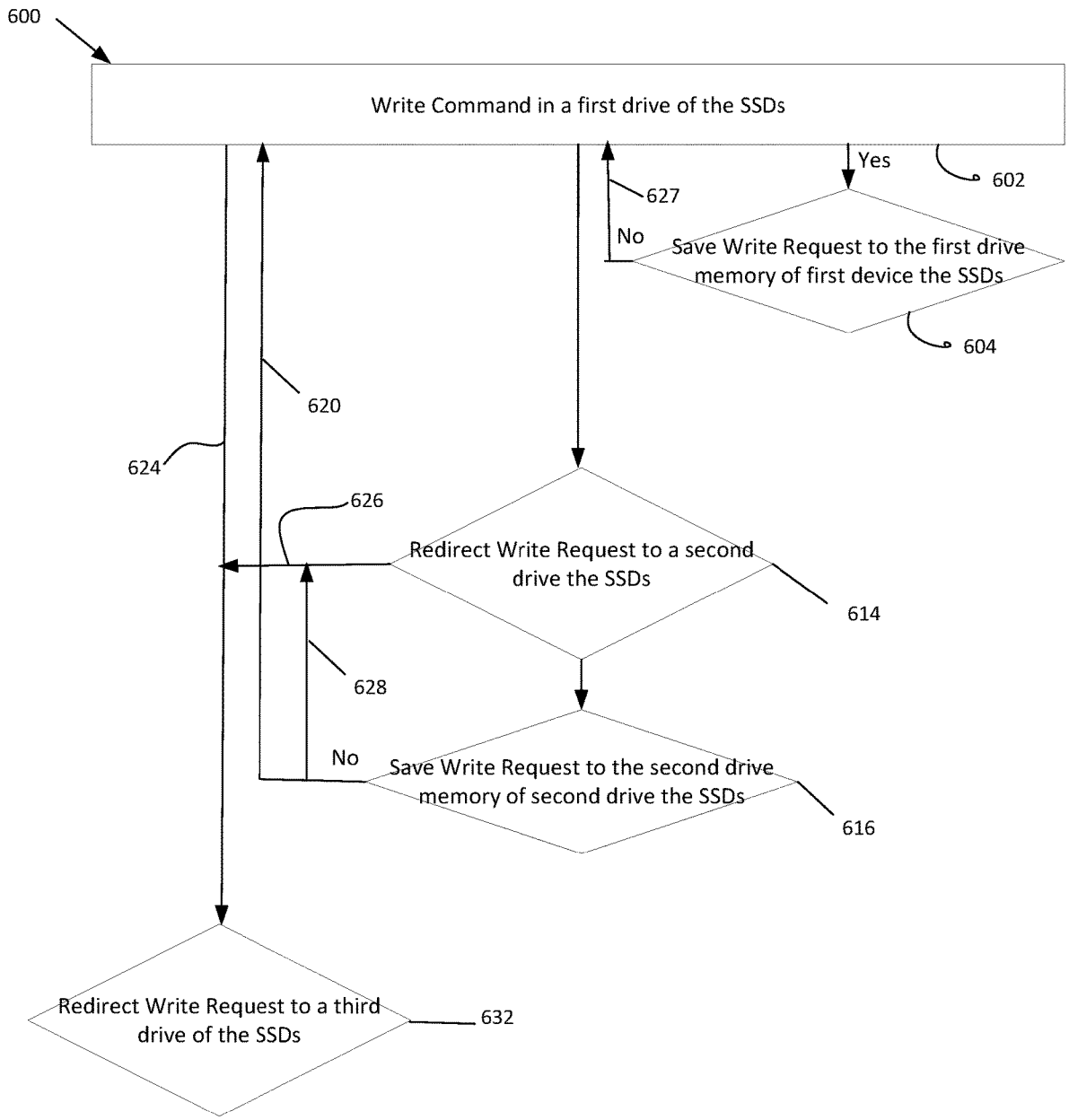
FIG. 7 is a flow diagram of an example process data processing and communication in a computing system in accordance with aspects of the disclosure.

FIG. 7 is a flow diagram of an example process 600 of processing a write command among the solid state drives in a computing system that utilizes the device-to-device communication in accordance with aspects of the disclosure. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

The process 600 starts at block 602 that a write command is received in a first drive of the data storage drives implemented in a computing system. As the write command is received in the first drive, the FTL in the first drive may process the write command and determine a memory block to store the data from the write command.

In one example, at block 604, the data from the write command may be determined to be written into a first drive memory in the first drive.

However, in the example wherein the data from the write command fails to be written into the first drive memory or is determined to move to other memory blocks for storage, the write command may then be further redirected back to the first drive, as shown by the arrow 627, and the first drive may re-transmit the write command to a second drive, as shown at block 614. The FTL in the second drive may then process the write command and determine a memory block in the second drive memory for data storage, as shown at block 616.

However, in the example wherein the data from the write command fails to be written into the second drive memory or is determined to move to other memory blocks for storage, the write command may then be further redirected back to the first drive, as shown by arrow 620, and the first drive may then communicate with a third drive, as shown by the arrow 624, to request for data storage, as shown at block 632. Alternatively, the write command may then be further redirected back to the second drive, as shown by the arrow 628, and the second drive may re-transmit the write command to a third drive, as shown by the arrow 626, for data storage, as shown at block 632. Alternatively, the communication among the first, second and third FTLs configured in each drive may communicate simultaneously to determine a suitable memory block available to process and store the write command.

The present disclosure provides an interconnect protocol that enables direct communications and/or data transmissions among data storage drives implemented in a computing system with minimum involvement from a host computing device in a computing system. The flash translation layer (FTL) in each data storage drive may be operated in a cooperative manner that allows direct communications and/or data transmissions across the data storage drives, such as D2D communication or memory-to-memory communication, in the storage appliance in the computing system. Thus, the D2D communication enables the construction of much larger storage appliances in the drive level, without needing to increase the performance of the host computing device implemented in the computing system. Thus, the flexibility of scaling up the storage appliance in the computing system becomes simple and less complicated.

Although a process may be described as including a plurality of operations, that does not imply that all or any of the operations are preferred, essential or required. Various other implementations may include other processes that omit some or all of the described operations. Although a process may be described singly or without reference to other products or processes, in some examples the process may interact with other products or processes. Such interaction may be provided to enhance the flexibility or desirability of the process.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

Numerous examples are described in the present application and are presented for illustrative purposes only. The described examples are not, and are not intended to be, limiting in any sense. One of ordinary skill in the art will recognize that the disclosed subject matter may be practiced with various modifications and alterations, such as structural, logical, software, and electrical modifications. It should be understood that the described features are not limited to usage in the one or more particular examples or drawings with reference to which they are described, unless expressly specified otherwise.

The foregoing discussion is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

The invention claimed is:

1. A method of processing a command, comprising:
   receiving, by one or more processors in a first solid state drive disposed in a computing system, an operational command;
   directly communicating, in response to the operational command and by a first buffer manager disposed in the first solid state drive, with a second buffer manager disposed in a second solid state drive disposed in the computing system, wherein the first solid state drive and the second solid state drive are physically connected for direct communication;
   determining, by the first buffer manager and via direct communication with the second buffer manager, a storage space in memory of the first solid state drive and/or the second solid state drive to store data associated with the received operational command based on a capacity and wear capability of the first solid state drive and the second solid state drive;
   storing the data in the first solid state drive and/or the second solid state drive based on the determined storage space using the first buffer manager and/or the second buffer manager, wherein the stored data is directly accessible by both the first solid state drive and the second solid state drive to divide workloads associated with the operational command; and
   processing, by the one or more processors based on the communicating, the divided workloads associated with the operational command.

2. The method of claim 1, wherein coordinating to determine the storage space in memory to store the data associated with the received operational command is further based on a type of the operational command.

3. The method of claim 2, wherein when the operational command is a read command, the coordinating to determine the storage space in memory to store the data associated with the received operational command is further based on a flash translation layer indicating where the data resides in the first and/or second solid state drives.

4. The method of claim 2, wherein when the operational command is a write command, the coordinating to determine the storage space in memory to store the data associated with the received operational command is based on an allocation table including at least one of global drive properties or global drive wear statistics.

5. The method of claim 4, wherein the global drive properties comprise at least one of the capacity or the wear capability.

6. The method of claim 1, wherein directly communicating with the second solid state drive further comprises directly communicating without communicating with a host computing device in the computing system.

7. The method of claim 1, wherein the operational command includes a data write command, a data read command, a data program command or a data erase command.

8. The method of claim 1, wherein the stored data is defined in a plurality of non-volatile memory disposed in the first or second solid state drives.

9. The method of claim 8, wherein the plurality of non-volatile memory is a plurality of NAND flash memory.

10. The method of claim 1, wherein the direct communication between the first and the second solid state drives is transmitted using an interconnection link protocol defined between the first and the second solid state drives.

11. The method of claim 10, wherein the interconnection link protocol enables direct communications between the first and the second solid state drives without communicating with a host computing device in the computing system.

12. An apparatus, comprising:
    a computing system, comprising:
       a host computing device;
       a plurality of solid state drives in communication with the host computing device; and
       an interconnection link protocol in connection with the plurality of solid state drives, wherein the interconnection link protocol is configured to:
          allow direct communication among the plurality of the solid state drives without involvement from the host computing device, wherein the direct communication is among buffer managers disposed in each solid state drive of the plurality of the solid state drives, wherein the plurality of the solid state drives are physically connected for direct communication;
          determine, using a first buffer manager and via direct communication with a second buffer manager, a storage space in memory of a first solid state drive and/or a second solid state drive of the plurality of solid state drives to store data associated with the direct communication based on a capacity and wear capability of the first solid state drive and the second solid state drive; and
          store the data in the first solid state drive and/or the second solid state drive based on the determined storage space using the first buffer manager and/or the second buffer manager, wherein the stored data is directly accessible by both the first solid state drive and the second solid state drive to divide workloads associated with the direct communication between the first and second buffer managers.

13. The apparatus of claim 12, wherein the interconnection link protocol allows direct communication among flash translational layers, wherein a flash translation layer is disposed in a solid state drive of the plurality of the solid state drives.

14. A system for processing a command, the system comprising one or more processors configured to:
- receive an operational command in a first solid state drive disposed in a computing system;
- directly communicate, in response to receiving the operational command, from a first buffer manager disposed in the first solid state drive to a second buffer manager disposed in a second solid state drive disposed in the computing system, wherein the first solid state drive and the second solid state drive are physically connected for direct communication;
- determine, by the first buffer manager and via the direct communication with the second buffer manager, a storage space in memory of the first solid state drive and/or the second solid state drive to store data associated with the received operational command based on a capacity and wear capability of the first solid state drive and the second solid state drive;
- store the data in the first solid state drive and/or the second solid state drive based on the determined storage space using the first buffer manager and/or the second buffer manager, wherein the stored data is directly accessible by both the first solid state drive and the second solid state drive to divide workloads associated with the operational command; and
- process the divided workloads associated with the operational command.

\* \* \* \* \*